United States Patent Office.

FRIEDRICH HERMANN HÄHLE, OF DRESDEN, GERMANY, ASSIGNOR TO DR. F. VON HEYDEN NACHFOLGER, OF RADEBEUL, GERMANY.

CATECHOL ETHER.

SPECIFICATION forming part of Letters Patent No. 580,575, dated April 13, 1897.

Application filed March 7, 1895. Serial No. 540,865. (Specimens.)

*To all whom it may concern:*

Be it known that I, FRIEDRICH HERMANN HÄHLE, of Dresden, in the Kingdom of Saxony, in the German Empire, have invented a new Alkyl Ether of Pyrocatechin, of which the following is a specification.

This invention consists in a new and hitherto unknown substance, monoethyl ether of pyrocatechin or catechol, which has the chemical formula $$C_6H_4\begin{matrix}OH\\OC_2H_5\end{matrix}.$$

This new substance crystallizes with remarkable ease into large well-developed glass-bright colorless prisms which easily melt. The point of setting or solidification of the molten substance is at 26° to 27° centigrade. The substance boils at 215° centigrade. It is very difficultly soluble in water, easily soluble in alcohol and ether and in an aqueous diluted soda-lye, in which the soda salt $$C_6H_4\begin{matrix}ONa\\OC_2H_5\end{matrix}$$

is formed.

If concentrated soda-lye is used, the soda salt is immediately separated in solid form as a white crystal mass. The new substance has an agreeable aromatic smell resembling, to a certain degree, the smell of thymol. It serves for producing odoriferous substances and as an antiseptic.

By Heinisch in the Vienna *Journal Monatshefte für Chemie*, 15, page 152, a substance has already been described which the discoverer supposed to be ethyl ether of pyrocatechin $$C_6H_4\begin{matrix}OH\\OC_2H_5\end{matrix}$$

This supposition, however, has proved to be an error. The substance described by Heinisch is not the monoethyl ether of the pyrocatechin. The Heinisch substance is totally different from the monoethyl ether of pyrocatechin. Heinisch's substance is a non-crystallizable liquid. The monoethyl ether of the pyrocatechin, however, is a solid substance, characterized by a very extended faculty or ability of crystallization. The Heinisch substance boils at 240° to 241° centigrade. The monoethyl ether of pyrocatechin, however, boils at 215° centigrade.

The monoethyl ether of the pyrocatechin may be produced in different ways. The simplest manner will be by the ethylization of pyrocatechin, for instance, according to the following statement:

Eleven kilograms of pyrocatechin are dissolved in four kilograms of caustic soda and twenty kilograms of water, and to this solution another solution is added consisting of fourteen and eight-tenths (14.8) kilograms of ethyl sulfate of sodium and sixteen kilograms of water. After thoroughly shaking this mixture the same is digested for about four hours at a pressure of about two to three atmospheres. Afterward the contents of the vessel are distilled off by means of steam, whereby the mono and di ethyl ether of pyrocatechin will distil off as colorless oils. This mixture of the two said ethyl ethers of pyrocatechin is afterward well mixed with a solution of four kilograms of caustic soda in about twenty-five kilograms of water, and after a certain period of rest the diethyl ether of pyrocatechin, which has remained undissolved, is drawn off and the monoethyl ether of pyrocatechin is separated from the alkaline solution by an acid.

Instead of the 14.8 kilograms of ethyl sulfate of sodium 10.9 kilograms of bromethyl or 6.45 kilograms of chlorethyl may be used.

What I claim as my invention is—

The within-described new substance, monoethyl ether of pyrocatechin, of the chemical formula $$C_6H_4\begin{matrix}OH\\OC_2H_5\end{matrix}$$

and having the following characteristic qualities, viz: difficultly soluble in water, easily soluble in alcohol, in ether and in diluted aqueous soda-lye, solidifying with concentrated soda-lye into white salt $$C_6H_4\begin{matrix}ONa\\OC_2H_5\end{matrix}$$

which on addition of water will liquefy, having an aromatic, feebly-thymol-like smell, having a boiling-point of 215° centigrade, and solidifying at from 26° to 27° centigrade, and crystallizing easily into colorless, bright, transparent prisms.

In testimony that I claim the foregoing as my invention I have signed my name in presence of two subscribing witnesses.

FRIEDRICH HERMANN HÄHLE.

Witnesses:
HERNANDO DE SOTO,
WILHELM WIESENHÜTTER.